J. L. COOK.
MEANS FOR PRACTISING RAPID WRITING.
APPLICATION FILED FEB. 3, 1914.

1,162,849.

Patented Dec. 7, 1915.

Inventor,
Jesse L. Cook.

Witnesses:
Wm. B. Prake.
A. Patek.

By David O. Barnell.
Attorney.

UNITED STATES PATENT OFFICE.

JESSE L. COOK, OF OMAHA, NEBRASKA.

MEANS FOR PRACTISING RAPID WRITING.

1,162,849.     Specification of Letters Patent.     Patented Dec. 7, 1915.

Application filed February 3, 1914. Serial No. 816,326.

*To all whom it may concern:*

Be it known that I, JESSE L. COOK, a citizen of the United States, and a resident of Omaha, in the county of Douglas and State of Nebraska, have invented certain new and useful Improvements in Means for Practising Rapid Writing, of which the following is a specification.

My invention relates to educational appliances, and it is the object thereof to provide a simple and inexpensive means for facilitating the practice of rapid writing by students of shorthand or stenography, stenotypy, penmanship, typewriting or the like.

The invention provides a means by which the subject matter to be written is presented to the student at a rate corresponding exactly to the speed at which he is capable of writing, thus attaining the effect of dictation at a rate exactly proportioned to the writing-speed of the individual student.

The invention is especially useful for the practice of shorthand writing.

Figure 1:
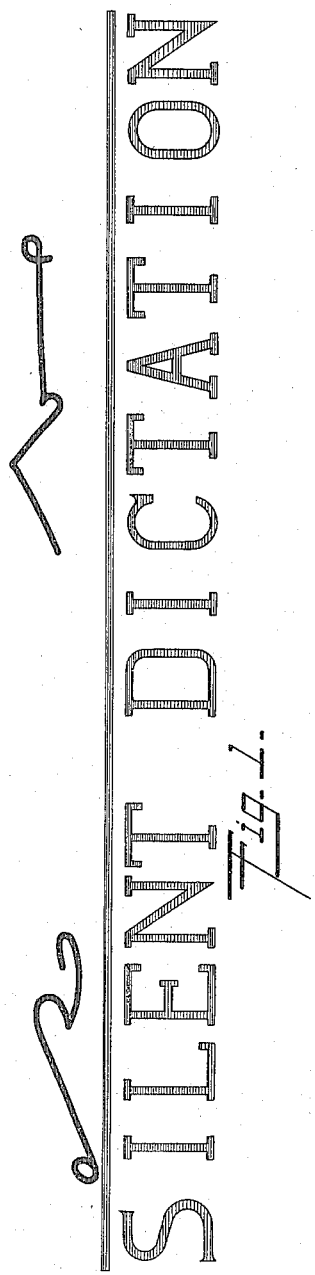
Figure 2:
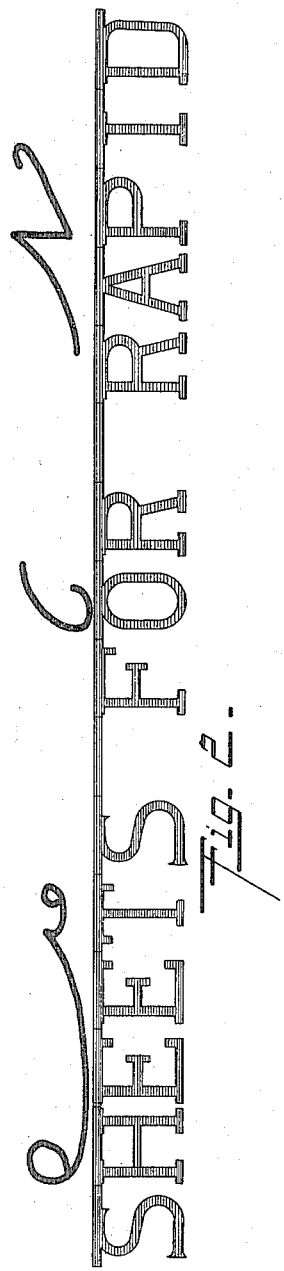
Figure 3:
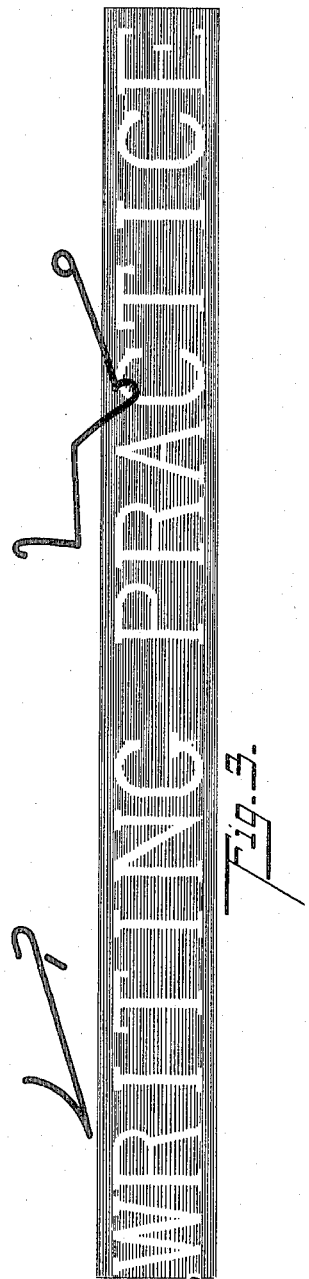

In the accompanying drawings, Figure 1 is an illustration on an enlarged scale of one embodiment of and manner of using the invention, Fig. 2 illustrates a modification of the same, and Fig. 3 illustrates a further modification thereof.

In carrying out my invention the subject matter to be written by the student is printed on paper or other material having a suitable surface for receiving writing of the kind which the student is to practice. The printing is done with a pale or light-colored ink so that when the sheet is written over the writing will stand out prominently, while the printed subject-matter or text will be comparatively inconspicuous. In some cases it may be desirable to print the text with a fugitive ink, such that the same will fade out and disappear after a time, or which may be removed by treatment with chemicals, so that the writing alone will remain on the sheet. By this means, subsequently to the writing of the exercise, and after the text or printed matter has faded or been removed, the student may employ the matter previously written by himself as a reading exercise, and again transcribe the same. Thus, should the original text consist of words formed by letters in ordinary type, and be used for the practice of shorthand writing, the same sheet can be employed, subsequently to the fading or removal of the printed text, for transcribing the shorthand characters into longhand or typewriting, the student's own previously-made shorthand notes then forming the text and being employed by him as a reading exercise while he reproduces, as by typewriting, the words which formed the original printed text.

For use in practising shorthand writing, there is printed, in addition to the wording or text, a guide-line on which, or with reference to which, the shorthand characters are to be written; since in most systems of shorthand writing many of the characters are written "in position", having different meanings accordingly as they are located on, above, through or below a guide-line.

In that embodiment of the invention represented in Fig. 1 the guide-line or reference-line for the writing of the shorthand characters is disposed immediately above the text-letters which form the words "Silent dictation". Shorthand characters, representing phonetically the same sounds as the printed words, are indicated as written by the student above the respective words. The character representing the word "Silent" is written in normal position on the guide-line. The character representing the word "Dictation" is written high, or above the guide-line, this position being employed, in the system from which the characters are derived, to indicate the initial sound of "D" in the word.

In that embodiment of the invention represented in Fig. 2, a special type is employed, the upper parts of the letters being extended so as to join each other and form a continuous horizontal line which constitutes the guide-line for the shorthand characters. As before, the shorthand characters are indicated as written by the student upon said guide-line.

In the embodiment of the invention illustrated in Fig. 3, the guide-line for the shorthand characters is formed by the upper edge of a wide line or printed surface, whereon the text-letters of the words "Writing practice" are formed by blank spaces in the printed surface.

It will be understood, of course, that the letters and characters illustrated in the drawings are greatly enlarged, the letters actually employed preferably being about the same size as those of ordinary typewritten matter, so as to be easily read, and the space between the successive lines of printing being about proportional to that between the lines formed by the several figures of the drawings, so that ample space is left between the successive guide-lines for the writing of the shorthand characters.

For the practice of typewriting, and at the same time for exercise in reading shorthand, the printed text might consist of shorthand characters so arranged that a typewritten or a longhand transcript of the shorthand characters could be written in juxtaposed, or in part superposed, relation thereto on the same sheet. Such a use would amount to a reversal of the manner of use before described.

It will be obvious that in the use of the invention the words or characters of the text will be presented to the student simultaneously with the writing-space or surface on which the respective word or character is to be written, and that the effect of such presentation is essentially the same as though another person were to read or dictate to the student the subject-matter to be written by him, at a rate exactly proportional to his ability to write the words or characters.

Now, having described my invention, what I claim and desire to secure by Letters Patent is:

1. Means for the practice of rapid writing, comprising means forming a writing-surface, and text-matter printed on said surface in fugitive ink, the text matter being arranged so that the same surface may be used for writing characters having a significance corresponding to said text-matter.

2. A practice sheet for rapid writing, having text-matter printed thereon in faint-colored fugitive ink, the lines of said text matter formed by letters or type-characters each having a horizontal bar-portion extended so that all of said bar-portions form a continuous horizontal writing-line.

3. Means for the practice of rapid writing, comprising means forming a writing-surface, and text-matter printed on said surface in type-characters having horizontal contacting bar-portions forming guide-lines for the writing of other characters on the same surface and overlying the characters of the text-matter.

In testimony whereof I have hereunto subscribed my name in the presence of two witnesses.

JESSE L. COOK.

Witnesses:
D. O. BARNELL,
WM. B. DRAKE.

Copies of this patent may be obtained for five cents each, by addressing the "Commissioner of Patents, Washington, D. C."